No. 734,587. PATENTED JULY 28, 1903.
A. MIESSE.
CAR FENDER.
APPLICATION FILED JAN. 5, 1903.
NO MODEL. 2 SHEETS—SHEET 1.
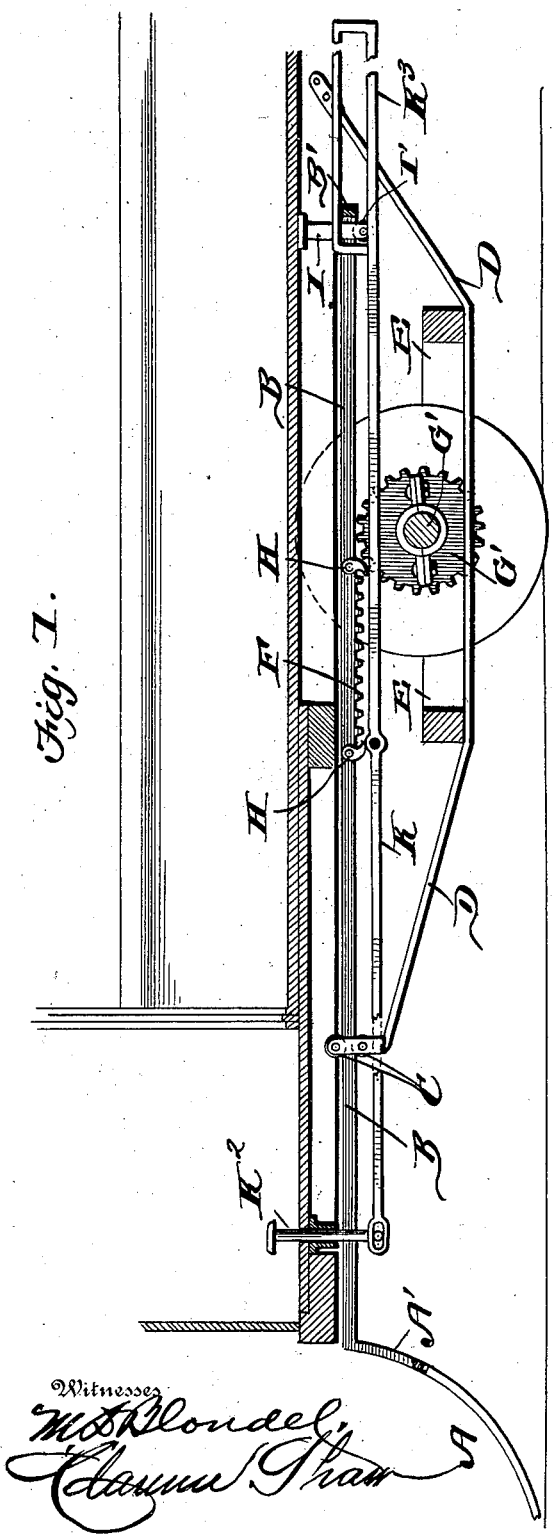
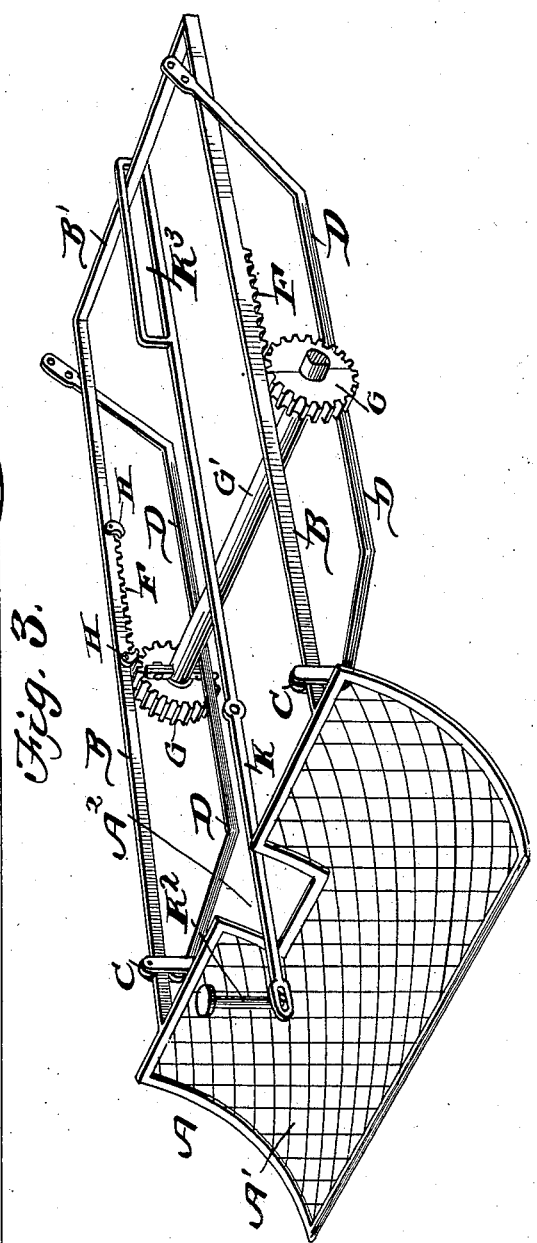
Inventor
A. Miesse.

No. 734,587. PATENTED JULY 28, 1903.
A. MIESSE.
CAR FENDER.
APPLICATION FILED JAN. 5, 1903.
NO MODEL. 2 SHEETS—SHEET 2.
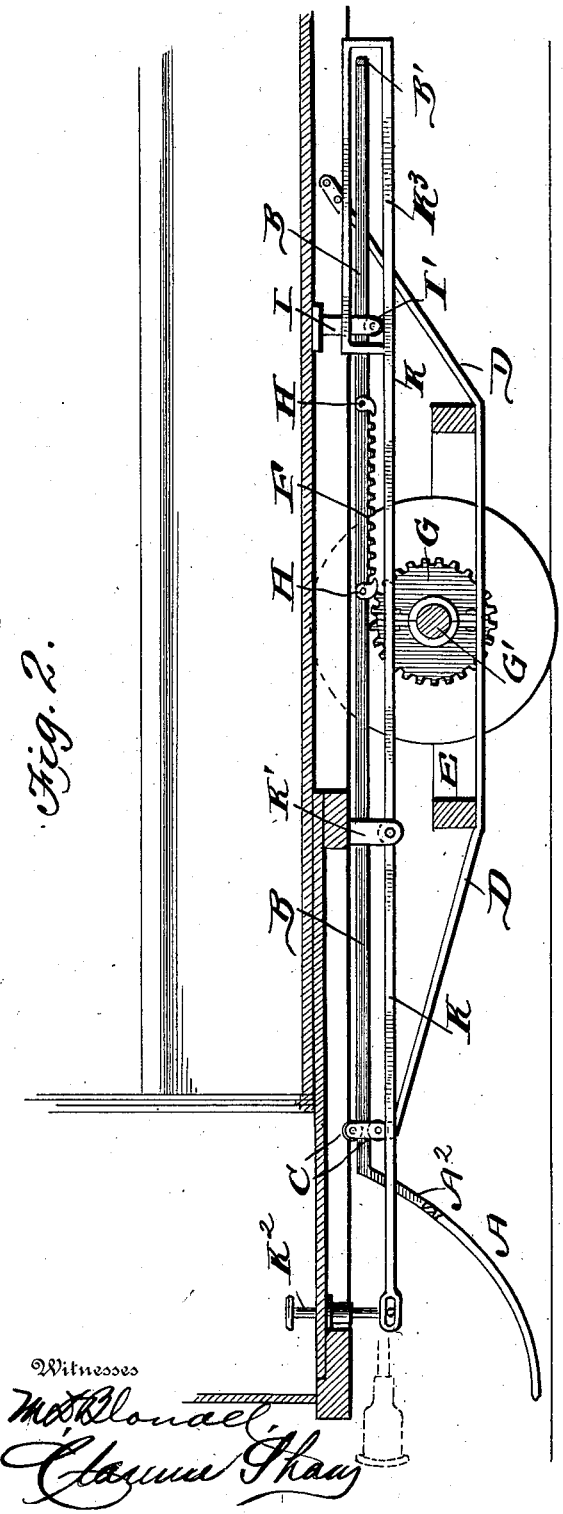
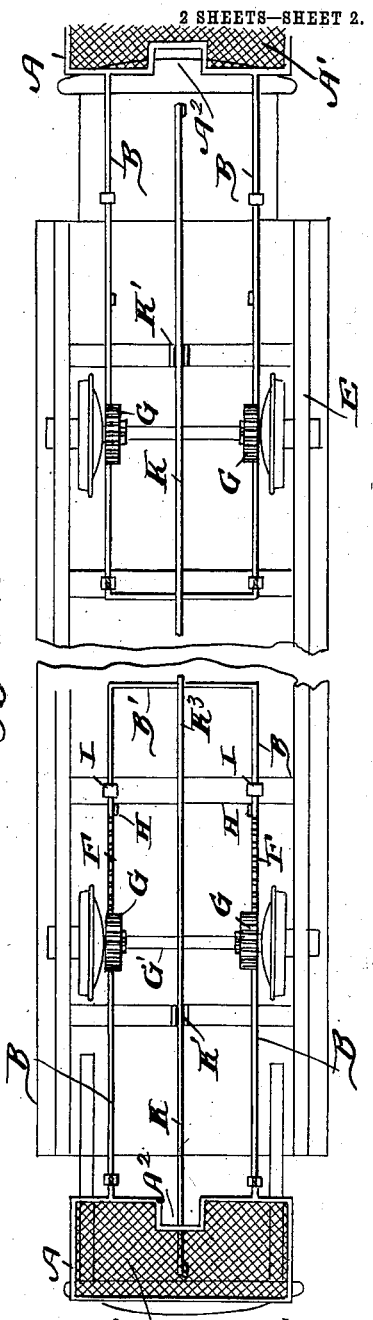

No. 734,587. Patented July 28, 1903.

UNITED STATES PATENT OFFICE.

AMERICUS MIESSE, OF LIMA, OHIO, ASSIGNOR OF TWO-THIRDS TO EDWARD P. JACKMAN AND WASHINGTON CARR, OF LIMA, OHIO.

CAR-FENDER.

SPECIFICATION forming part of Letters Patent No. 734,587, dated July 28, 1903.

Application filed January 5, 1903. Serial No. 137,894. (No model.)

*To all whom it may concern:*

Be it known that I, AMERICUS MIESSE, a citizen of the United States, residing at Lima, in the county of Allen and State of Ohio, have invented a new and useful Car-Fender, of which the following is a specification.

This invention relates generally to car-fenders, and more particularly to one wherein the said fender is projected forwardly by the forward movement of the car and held in such position during such forward movement and retracted by the reverse movement of said car.

Another object of the invention is to provide a fender at each end, so that when the motion of the car is reversed and one fender is retracted the other fender will be projected forwardly, so that the car will always have a fender properly held at the forward end thereof while the car is moving forwardly.

Another object of the invention is to provide means to prevent the retraction of the fender at the forward end when the car is moved rearwardly or backwardly for a short distance.

With these and certain other objects in view the invention consists in the novel features of construction, combination, and arrangement, all of which will be fully described hereinafter and pointed out in the claims.

In the drawings forming a part of this specification, Figure 1 is a sectional view partly in elevation and illustrating my improved construction of fender arranged upon a car and projecting forwardly to its operative position. Fig. 2 is a similar view showing the said fender retracted or withdrawn. Fig. 3 is a detail perspective view of the operative parts of the fender. Fig. 4 is a bottom plan view of a car having a fender applied thereto at each end, one of the fenders being projected forwardly and the other one held in place beneath the rear end of the car.

In carrying out my invention I employ a fender-frame A, which is curved, as shown, and provided with any suitable construction of net A'. This fender-frame A has two parallel bars B, connected to the upper end thereof adjacent to the sides, said bars extending rearwardly a considerable distance and are connected at their rear ends by a cross-beam B'. The forward portions of these bars B travel between guide-rollers C, carried at the forward ends of the bracket-arms D, said bracket-arms being connected to the truck-frame E and secured at their rear or inner ends to the bottom timbers of the car. Each bar B is provided with rack-teeth F upon the lower face thereof adjacent to the central portion of said bar, said teeth being adapted to engage the pinions G, mounted upon the axle G', said pinions being preferably made in two sections bolted together, so that they can be easily attached to the cross-axle. At each end of the series of rack-teeth downwardly-hanging pawls H are pivoted. The rack-bars resting upon and engaging the pinions, the forward movement of the car will serve to project the fender forwardly, as shown in Fig. 1. The forward or outer movement of the fender is checked by the cross-bar B' contacting with the hanger-brackets I, the additional purpose of which will appear hereinafter, and the forward or outer movement of the fender is arrested at a time when the rack-teeth have been moved forwardly to a position out of engagement with the pinions. The rear or innermost depending pawl, however, will rest upon the pinion and will be unaffected by the forward movements of said pinion. Upon the reverse movement, however, of said pinion the pawls would be engaged, drawing the rack-bars back a sufficient distance to bring the rack-teeth into engagement with the pinion and the continued rearward movement of the pinion acting upon the rack-bars would serve to draw the pawls H inwardly or rearwardly, thereby withdrawing the fender beneath the car, as most clearly shown in Fig. 2, and the pawls at the opposite ends of the rack-sections will then be engaged by the pinions in exactly the same manner as the opposite pawls were engaged during the forward movement of the pinion—that is, the rearward movements of the pinion would not affect the pawls, but the forward movement of the pinion would operate upon the pawls so as to bring the rack-teeth again into engagement with the pinions. Thus it will be seen that reversing the motion of the car will serve to operate the fender, thereby avoiding the necessity of shifting or rearranging the fender each time the direction of the car is changed.

The hanger-brackets I are preferably bifurcated and provided with a guide-roller I', over which the rear or inner ends of the bars B rest, said bars passing through the bifurcated hanger-brackets. In order to permit the car to be moved in either direction without affecting the position of the fender, I employ a lever K, pivoted in the depending hanger K', attached to the bottom of the car and pivotally connected at its forward end to a push-rod $K^2$, passing upwardly through the platform of the car. The rear end of this lever is constructed with a loop $K^3$, through which the cross-bar B' passes, and by pressing downwardly upon the push-rod $K^2$ the rear end of the lever is lifted upwardly, and the loop $K^3$, engaging the cross-bar B', lifts the side bars B a sufficient distance away from the pinions and prevents the depending pawls being operated upon by the said pinion. The fender-frame is preferably cut away at the upper central portion, as indicated at $A^2$, in order to permit the said fender-frame to be moved horizontally without interfering with the draw-bar of the car. This opening also provides ample time for the movement of the lever K.

It will thus be seen that I provide an exceedingly simple and efficient construction of car-fender which will be automatically operated by the movement of the car, the position of said fender being determined and regulated by the movement of said car.

Having thus fully described my invention, what I claim as new, and desire to secure by Letters Patent of the United States, is—

1. In a car-fender the combination with the fender-frame, of the horizontal rack-bars connected thereto, pinions arranged upon the car-axle and adapted to engage the rack-bars, means for supporting the rack-bars, together with stop devices for limiting the outward movements of the fender and means carried by the rack-bars for throwing the pinions into engagement with the said rack-bars, as specified.

2. The combination with a supporting-frame having suitable guides, of a fender-frame having horizontal rack-bars connected therewith, said rack-bars working in the guides of the supporting-frame, the pinions mounted upon the car-axle and adapted to engage the rack-bars, the depending pawls carried by the rack-bars at each end of each series of teeth, the cross-bar connecting the rear ends of the rack-bars and a lever having a push-rod at its forward end and a loop at its rear end, all arranged and adapted to operate substantially as described.

3. The combination with a fender-frame having a horizontal movable frame connected therewith, the side members thereon having rack-teeth arranged thereon, of the pinions arranged upon the axle and adapted to engage the rack-teeth, means carried by the side bars of the horizontal frame adapted to engage the pinions for the purpose of throwing the pinions into engagement with the rack-bars, and means for disengaging the said rack-bars from the pinions, substantially as specified.

4. In a device of the kind described, the combination with the pinions, of the rack-bars arranged to engage the same, the depending pawls arranged at each series of rack-teeth, substantially as described.

AMERICUS MIESSE.

Witnesses:
H. S. PROPHER,
R. C. EASTMAN.